(12) United States Patent
Miyamoto et al.

(10) Patent No.: US 7,763,383 B2
(45) Date of Patent: Jul. 27, 2010

(54) SEALED NICKEL-ZINC PRIMARY CELL

(75) Inventors: Kunihiko Miyamoto, Edogawa-ku (JP); Shuichiro Irie, Yokohama (JP); Eiki Kashiwazaki, Usui-gun (JP); Teiji Okayama, Takasaki (JP)

(73) Assignee: Toshiba Battery Co., Ltd., Tokyo (JP)

( * ) Notice: Subject to any disclaimer, the term of this patent is extended or adjusted under 35 U.S.C. 154(b) by 605 days.

(21) Appl. No.: 10/514,556

(22) PCT Filed: May 28, 2003

(86) PCT No.: PCT/JP03/06699

§ 371 (c)(1),
(2), (4) Date: Jun. 14, 2005

(87) PCT Pub. No.: WO03/103080

PCT Pub. Date: Dec. 11, 2003

(65) Prior Publication Data

US 2005/0244712 A1    Nov. 3, 2005

(30) Foreign Application Priority Data

May 31, 2002  (JP) .............................. 2002-159393

(51) Int. Cl.
*H01M 4/50* (2010.01)
(52) U.S. Cl. .................. 429/223; 429/224; 429/229
(58) Field of Classification Search .............. 429/218.1, 429/223, 224, 231, 231.8, 209, 229
See application file for complete search history.

(56) References Cited

U.S. PATENT DOCUMENTS 6,265,105 B1 * 7/2001 Tokuda et al. ................ 429/206
6,399,247 B1 * 6/2002 Kitayama et al. ............ 429/223

(Continued)

FOREIGN PATENT DOCUMENTS

EP           1 113 512 A1   7/2001

(Continued)

OTHER PUBLICATIONS

U.S. Appl. No. 12/435,963, filed May 5, 2009, Miyamoto et al.

*Primary Examiner*—Jennifer Michener
*Assistant Examiner*—Monique Wills
(74) *Attorney, Agent, or Firm*—Oblon, Spivak, McClelland, Maier & Neustadt, L.L.P.

(57) ABSTRACT

The object of the invention is to provide an alkali primary battery being excellent in high rate discharge characteristics with less increase of the inner pressure by generating hydrogen in the overdischarge process. The invention provides a sealed nickel zinc primary battery comprising at least a positive electrode having a higher oxide of nickel as a positive electrode active substance, a negative electrode having zinc or an alloy thereof as a negative electrode active substance, a separator and an electrolyte solution housed in a vessel, wherein manganese dioxide is added in a proportion of 3 to 7% by mass relative to the higher oxide of nickel in the positive electrode, and the ratio between the theoretical capacity of the negative electrode to the theoretical capacity of the positive electrode (the theoretical capacity of the negative electrode/theoretical capacity of the positive electrode) is in the range of 1.2 to 1.0.

15 Claims, 1 Drawing Sheet

U.S. PATENT DOCUMENTS

2004/0043292 A1 * 3/2004 Christian et al. ............ 429/223
2004/0072070 A1 * 4/2004 Miyamoto et al. .......... 429/223

FOREIGN PATENT DOCUMENTS

| | | | |
|---|---|---|---|
| JP | 11-307093 | | 11/1999 |
| JP | 2000-251924 | | 9/2000 |
| JP | 2001-185138 | | 7/2001 |
| JP | 2002-075354 | * | 3/2002 |
| JP | 2002-75354 | | 3/2002 |
| JP | 2003-242990 | | 8/2003 |
| WO | WO 00/21151 | | 4/2000 |

* cited by examiner

SEALED NICKEL-ZINC PRIMARY CELL

TECHNICAL FIELD

The invention relates to a sealed nickel zinc primary battery.

BACKGROUND ART

Hitherto, manganese dioxide has been mainly used as a positive electrode active substance in alkali batteries. However, since devices particularly requiring high output has been increased in accordance with remarkable developments of various portable electronic devices in recent years, developments of batteries more excellent in high rate discharge characteristics than those of most frequently used alkali manganese batteries have been expected.

Meanwhile, a sealed alkali zinc secondary battery comprising a positive electrode composed of nickel oxyhydroxide as a major construction material, a negative electrode using an alloy composed of zinc as major component, a separator and a metal container has been known (British Patent No. 365125). This battery is known to have excellent features such as (1) a battery voltage of as high as 1.73 V, (2) flatness of a discharge curve and (3) high utilization rate in high rate discharge. However, it was a problem that the electric capacity of this battery remarkably decreases during continuous or discontinuous discharge.

An inside-out nickel zinc secondary battery using nickel hydroxide as a positive electrode active substance and zinc as a negative electrode active substance has been also known (Japanese Patent Application Laid-Open (JP-A) No. 2000-67910). However, such battery involves a problem of leakage of electrolytes by generating oxygen gas from the positive electrode at the time of charging by repeating charge-discharge cycles to increase an inner pressure of the battery. Since this battery has a theoretical capacity ratio of 2:1 between the positive electrode and negative electrode, it is difficult to attain high capacitance.

It is also known that heavy load discharge characteristics after high temperature storage can be improved by using manganese dioxide and nickel oxyhydroxide as a mixture in the alkali battery (JP-A No. 2000-48827). In this invention, manganese dioxide and nickel oxyhydroxide are used as a cathode mix so that the blending ratios of manganese dioxide and nickel oxyhydroxide of 20 to 90 parts by weight and 80 to 10 parts by weight, respectively. Since a plateau characteristic of manganese dioxide appears at around 1.1 V when the cathode mix mainly composed of manganese dioxide is used as in the invention above, the high rate discharge capacity tends to vary and to lead to deterioration of the high rate discharge capacity at low temperatures to impair the use of the battery.

Based on the situation above, the applicant of the invention noticed it preferable that nickel oxyhydroxide is mainly used as a cathode mix in the devices requiring high rate discharge characteristics such as digital cameras, and have filed an application about a nickel zinc primary battery in which nickel oxyhydroxide is used as a positive electrode active substance (JP-A No. 2000-351812).

While the nickel zinc primary battery has been confirmed to be quite excellent in high rate discharge characteristics, the following problems remain to be improved in the battery using nickel oxyhydroxide only as the active substance of the cathode mix.

(1) When a hollow positive electrode is molded, a large quantity of nickel oxyhydroxide adheres on a mold to fail in obtaining the hollow positive electrode having sufficient moldability. This causes a decrease of discharge capacity during low rate discharge while it is disadvantage for designing a theoretical capacity ratio of the positive electrode to the negative electrode in an overdischarge process.

(2) While the theoretical capacity ratio of the negative to positive electrodes obtained by dividing the theoretical capacity of the negative electrode by the electrode theoretical of the positive capacity is preferably 1.0 or more considering the high rate discharge characteristics, the amount of hydrogen gas generated from the positive electrode increases because the amount of residual zinc during the overdischarge process increases as the theoretical capacity ratio of the negative to positive electrodes increases. On the other hand, while the ratio between the capacity of the negative electrode and positive electrode is designed by controlling the weight of the positive and negative electrodes in producing the battery, the maximum ratio is about 1.2 when the minimum ratio is set at about 1.0 since the tolerance of the ratio is about ±0.1. However, since the amount of hydrogen gas generated increases by overdischarge when the theoretical capacity ratio of the negative to the positive electrode exceeds 1.1, hermetic sealing of the battery cannot be maintained unless a safety valve actuating pressure is increased in designing the battery. While the safety valve actuation pressure of the primary battery is usually adjusted to about 5 to 8 MPa, an actuating pressure of the safety valve exceeding this level may cause problems on safety.

DISCLOSURE OF THE INVENTION

The object of the invention performed for solving the problems in the conventional art is to provide an alkali battery being excellent in the high rate discharge characteristics with little increase of the inner pressure as a result of hydrogen generation by overdischarge.

The invention provides a sealed nickel zinc primary battery comprising at least a positive electrode having a higher oxide of nickel as a positive electrode active substance, a negative electrode having zinc or an alloy thereof as a negative electrode active substance, a separator and an electrolyte solution housed in a vessel, wherein manganese dioxide is added in a proportion of 2.3 to 7% by mass relative to the higher oxide of nickel in the positive electrode, and the ratio between the theoretical capacity of the negative electrode to the theoretical capacity of the positive electrode (the theoretical capacity of the negative electrode/theoretical capacity of the positive electrode; abbreviated as negative to positive electrode theoretical capacity ratio hereinafter) is in the range of 1.2 to 1.0.

The positive electrode active substance preferably comprises nickel oxyhydroxide as a eutectic crystal with zinc or cobalt alone, or with zinc and cobalt. In addition, the positive electrode preferably comprises composite nickel oxyhydroxide as a eutectic crystal with zinc or cobalt alone, or with both of them, coated with a higher oxide layer of cobalt on the surface.

Such sealed nickel zinc primary battery has a quite large industrial significance since it s able to suppress the inner pressure from increasing during an overdischarge without impairing the battery's own high rate discharge characteristics.

BEST MODE FOR CARRYING OUT THE INVENTION

Figure 1:
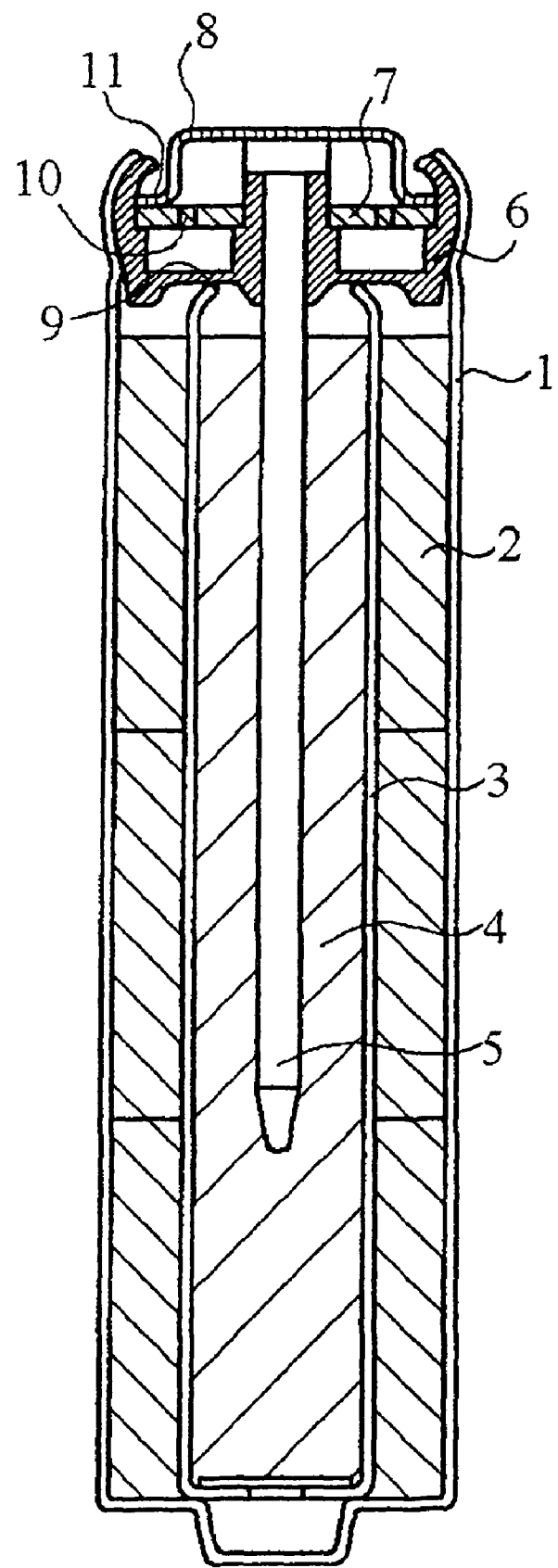
FIG. 1 is a cross section showing the principal construction of the zinc alkali battery according to an embodiment of the invention.

Detailed embodiments of the battery of the invention will be described hereinafter with reference to drawings. FIG. 1 shows an example in which the invention is applied to an LR6 battery prescribed in the JIS (a size AA battery) having a so-called inside-out structure (a structure having a battery vessel at a positive electrode side and a battery cap at a negative electrode side).

In the drawing, the reference numeral 1 denotes a bottom-sealed cylindrical metal vessel that also serve as a positive electrode terminal, and a cathode mix 2 containing a positive electrode active substance having a hollow cylindrical shape is housed within the metal vessel 1. A gelled zinc negative electrode material 4 is filled in the hollow part of the cathode mix 2 with interposition of a bottom-sealed cylindrical separator 3 composed of a nonwoven fabric. A charge collector rod 5 as a negative electrode composed of a metal rod is inserted into the negative electrode material 4. One end of the charge collector rod 5 as the negative electrode protrudes out of the surface of the negative electrode material 4, and is electrically connected to a ring-shaped metal plate 7 and a metal seal plate 8 that also serves as a negative electrode terminal. An insulation gasket 6 composed of a double-ring plastic resin is disposed between the inner face of the metal vessel 1 as the positive electrode and the outer circumference face of the protruded part of the charge collector rod 5 as the negative electrode, and the positive and negative electrodes are insulated to one another. Holes 10, 11 that functions as gas flow-out ports at the time of actuation of a safety valve are formed at the ring-shaped metal plate 7 and metal seal plate 8, and the insulation gasket 6 comprises a safety valve membrane 9 for reducing the inner pressure by permitting a gas to flow out by breaking a part of the membrane when the inner pressure of the battery increases above a prescribed pressure. The opening of the metal vessel 1 is sealed to be liquid-tight by caulking.

The positive electrode material, negative electrode material and electrolyte solution will be described in detail hereinafter.

(Positive Electrode Material)

The positive electrode active substance used in the invention mainly comprises nickel oxyhydroxide particles.

Nickel oxyhydroxide forming an eutectic crystal with zinc or nickel alone, or with both of them is preferable since structural changes is small even at a low ratio of the electrolyte solution. The proportion of zinc or nickel forming an eutectic crystal with nickel oxyhydroxide is preferably in a range of 1 to 7% by mass. The discharge capacity decreases when the proportion of zinc is smaller than the range above since the positive electrode is readily swelled. The shape of the battery may be also changed due to a large amount of swelling of the positive electrode depending on conditions. On the contrary, the battery is not suitable to have a high capacity due to a relatively decreased purity of nickel when the proportion is larger than the range described above.

It is preferable that the surface of nickel hydroxide is a composite oxyhydroxide formed by depositing a higher cobalt compound having high conductivity for ensuring electron conductivity between the nickel oxyhydroxide particles. Examples of starting materials of the cobalt compound coated on the surface include cobalt hydroxide ($Co(OH)_2$), cobalt monoxide (CoO) and dicobalt trioxide ($Co_2O_3$). These compounds are converted into a higher cobalt oxide having high conductivity such a cobalt oxyhydroxide (CoOOH) and tricobalt tetraoxide ($Co_3O_4$) by oxidation treatment.

The positive electrode active substance of the invention may be produced, for example, by the following method.

Cobalt hydroxide is added to the nickel hydroxide particles doped with zinc and cobalt, and an aqueous solution of sodium hydroxide is sprayed on the particles with stirring in an atmospheric environment. Composite nickel hydroxide particles in which a higher cobalt oxide layer is formed on the surface of nickel hydroxide is generated by successively heating with microwave. Oxidation is advanced by adding an oxidizing agent such as sodium hypochlorite to this reaction system, whereby composite nickel oxyhydroxide having higher oxide of cobalt deposited thereon can be produced. A positive electrode active substance having quite excellent conductivity can be obtained by the process described above.

Cobalt hydroxide having a specific surface area of 2.5 to 30 $m^2/g$ is preferably use as the cobalt particles or particles of cobalt compounds used in the process above. A contact area between cobalt hydroxide and nickel hydroxide is ensured by using the cobalt particles or particles of cobalt compounds having the specific surface area in the range as described above to result in an improvement of utilization ratio of the positive electrode. Such method for producing the cathode mix is described in JP-A Nos. 10-233229, 10-275620 and 10-188969, and the method for producing the cathode mix can be employed in the invention.

The capacitance preserving ratio at the time of storage can be improve by adding compounds of Y, Er, Yb and Ca to the positive electrode active substance comprising nickel hydroxide. Examples of the compound used in the invention include metal oxides such as $Y_2O_3$, $Er_2O_3$ and $Yb_2O_3$, and metal fluorides such as $CaF_2$. These metal oxides and metal fluorides may be used in the range of 0.1 to 2% by mass relative to nickel hydroxide which is the positive electrode active substance. It is not preferable that the amount of blending of the metal oxide and metal fluoride is smaller than or larger than the range above, since storability improving effect is not obtained in the former case while high capacity is not attained in the latter case due to relative decrease of the amount of the positive electrode active substance.

In the invention, manganese dioxide is added to the positive electrode active substance composed of the higher oxide of nickel in order to suppress hydrogen gas from generating in the overdischarge process. Manganese dioxide added to the higher oxide of nickel available in the invention is electrolytic manganese dioxide used in the conventional alkali battery. The amount of addition of manganese dioxide is preferably in the range of 3 to 7% by mass relative to the higher oxide of nickel. It is not preferable that the amount of addition is smaller than or larger than this range, since hydrogen gas cannot be sufficiently suppressed from being generated during the overdischarge in the former case, while high rate discharge characteristics, particularly high rate discharge characteristics in a low temperature environment, is deteriorated in the latter case.

Carbon particles are desirably mixed with the positive electrode material for improving conductivity and moldability of the positive electrode.

The carbon particles available include acetylene black, carbon black, artificial graphite and natural graphite. The proper proportion of blending of the positive electrode active substance to the carbon particles is in the range of 100:3 to 10 (mass ratio). High capacity cannot be attained due to relative decrease of the active substance when the proportion of blending of the carbon particles is higher than the range above, while high output characteristics cannot be obtained due to decrease of electronic conductivity and moldability when the proportion of blending of the carbon particles is lower than the range above.

A binder is preferably added in the cathode mix of the invention in order to enhance shape retainability for forming the cathode mix and for maintaining shape retainability during molding work and in the battery. Examples of such binder available include polytetrafluoroethylene (PTFE); polyvinylidene fluoride (PVdF); modified PVdF prepared by substituting at least one of hydrogen and fluorine in PVdF with other substituents; copolymer of vinylidene fluoride and 6-fluoropropylene; ternary copolymer of polyvinylidene fluoride, tetrafluoroethylene and 6-fluoropropylene; polyethylene; polypropylene; and polytetrafluoroethylene. The amount of addition of the binder is preferably in the range of 0.05 to 0.5% by mass relative to the cathode mix. Production yield of the battery decreases when the amount of addition is lower than the range above since the effect adding the binder is not expressed, while the capacity of the battery is impaired when the amount of blending of the binder exceeds the range above.

A lubricant may be added to the cathode mix for facilitating molding of the positive electrode material. Examples of the lubricant include graphite and stearic acid. The proper amount of addition is in range of 0.05 o 1.0% by mass relative to the amount of the cathode mix.

(Negative Electrode Material)

The negative electrode material used in the invention mainly comprises a zinc alloy as a negative electrode active substance, and a zinc gel used in the known manganese dioxide-zinc primary battery is available. The negative electrode material may be readily gelled by preparing an electrolyte gel from an electrolyte solution and a thickening agent, and by dispersing a negative electrode active substance in the gel.

A zinc alloy containing no mercury and lead known as a mercury free zinc alloy may be sued as the zinc alloy used in the invention. In particular, a zinc alloy comprising 0.06% by mass of indium, 0.014% by mass of bismuth and 0.0035% by mass of aluminum is desirable due to its effect for suppressing hydrogen gas from generating. Indium and bismuth are particularly preferable for improving discharge performance.

The reason why the zinc alloy used in place of pure zinc as the negative electrode active substance is that the alloy serves for retarding the autolysis speed in an alkaline electrolyte to enable hydrogen gas to be suppressed from generating in a sealed battery product and to prevent an accident caused by leakage of liquids.

The zinc alloy is desirably a powder for complying with discharge of large current by increasing the surface area. The average particle diameter of the zinc alloy of the invention is preferably in the range of 100 to 350 μm. The battery cannot comply with discharge of large current since the surface area is relatively reduced when the average particle diameter of the zinc alloy is larger than the range above. On the contrary, handling of the battery for assembling the battery becomes difficult to make it difficult to uniformly mix the electrolyte solution and gelling agent while the electrode is readily oxidized since the surface of the electrode is active, when the particle average diameter is smaller than the range above.

The thickening agent used in the invention includes polyvinyl alcohol, polyacrylic acid salts, CMC and alginic acid. Sodium polyacrylate is particularly preferable since it is stable against strong alkali.

(Electrolyte Solution)

The electrolyte solution used in the invention is preferably an aqueous solution comprising an alkali salt such as potassium hydroxide and sodium hydroxide as a solute, and potassium hydroxide is particularly used.

While the electrolyte solution is prepared by dissolving the alkali salt such as potassium hydroxide in water, a zinc compound is preferably added in the electrolyte solution. While examples of the zinc compound include zinc oxide and zinc hydroxide, zinc oxide is preferably used.

An aqueous alkaline solution containing at least the zinc compound is used as the electrolyte solution, because autolysis of the zinc alloy in the aqueous alkaline Solution is remarkably small as compared with in an acidic electrolyte solution. In addition, autolysis of the zinc alloy in the alkaline electrolyte solution is further suppressed by allowing zinc ions to present by dissolving, for example, zinc oxide.

A battery excellent in high rate discharge and suppression of generation of gases in the overdischarge process may be obtained in the invention by adding manganese dioxide to the positive electrode active substance as described above in the nickel zinc primary battery. The method for producing the battery will be described in detail following the production process.

(1) Preparation of Cathode Mix

Composite nickel hydroxide particles having the higher oxide of cobalt on the surface are produced using desired materials, and composite nickel oxyhydroxide containing the higher oxide of cobalt is produced by adding an oxidizing agent. Production of the composite nickel oxyhydroxide may be confirmed by identification by XRD, and by analyzing that almost all the amount of Ni is in a trivalent state by reverse titration with iron (II) ammonium sulfate/potassium permanganate. The purity of Ni in composite nickel oxyhydroxide is measured and calculated from EDTA titration and ICP analysis to obtain basic data for designing the battery.

The molded positive electrode is composed of the positive electrode active substance, manganese dioxide, a carbon conductor, a binder, an electrolyte and a lubricant, if desired. These materials are molded according to the steps below.

Dry stirring: A manganese dioxide powder and graphite powder are added to the nickel oxyhydroxide powder as the positive electrode active substance in a desired amount, and the mixture is stirred in a dry sate with a universal mixer. Stirring is continued for about five minutes.

Wet stirring: The electrolyte solution is added to 100 parts by mass of the mixed powder obtained by dry stirring, and the mixture is stirred in wet state with the universal mixer. The powder of the cathode mix components mixed by dry stirring is moldable in this step by allowing the particles to aggregate to one another. The amount of the electrolyte solution used in this step is 2 to 7 parts by mass relative to 100 parts by mass of the cathode mix components. A stirring time of about five minutes is sufficient.

Compression: The mixture obtained is compressed into a plate using a dual-roll press machine. The pressure of the dual-roll press machine is adjusted so that the thickness of the compressed plate product is about 1 mm.

Pulverization: The compressed plate product is pulverized with a pulverizer.

Sieving: The pulverized powder is classified with an automatic sieve with 22 to 100 meshes to obtain granules of the cathode mix with a particle diameter of 150 to 710 μm.

Mixing with stirring: A desire amount of a powder of a steric acid compound as a lubricant to the granular mix obtained in the step above, and the mixture is mixed with stirring. A stirring time of about five minutes is sufficient. The granular cathode mix is thus prepared.

Molding of cathode mix: The granular cathode mix and an artificial graphite powder, which is a conductive agent while giving moldability and releasability from a mold, are mixed with stirring. A hollow cylinder of the cathode mix is molded by compression using a mold for forming the cathode mix corresponding to LR6 battery prescribed in the JIS.

(2) Preparation of Anode Mix

A powder of a mercury free zinc alloy, an aqueous solution of potassium hydroxide (electrolyte solution) supplemented with zinc oxide and a gelling agent is mixed with stirring in vacuum to prepare a negative electrode of gelled zinc.

(3) Preparation of Separator

A cylindrical body is produced by winding a nonwoven fabric made of a fiber of a polyethylene resin followed by heat-fusion of a part of the cylinder. A round disk is punched from, for example, a polyethylene resin sheet, and a bottom-sealed separator is prepared by fusing the disk at one end of the cylinder by heating.

(4) Assembly of Alkali Battery

The cathode mix with the hollow cylinder shape prepared in the above step is housed in a metal vessel of the cathode, and the separator is placed in the hollow portion of the cathode mix. The electrolyte solution is injected into the cylinder of the cathode mix followed by injecting the gelled anode into the separator. Required battery construction members such as an insulation gasket are fitted within the gelled anode, one end of a charge collector rod of the negative electrode comprising a seal plate that serves as a negative electrode terminal at the other end is inserted, and the battery is assembled by caulking the opening of the battery vessel.

When contact resistance between the cathode mix and the vessel of the cathode is very large as the vessel of the battery, a paint containing a carbonaceous material may be coated on the inner surface of the vessel of the cathode to reduce the contact resistance.

EXAMPLE

The present invention will be described on the basis of example and comparative example.

Added to 100-Parts by mass of nickel hydroxide particles doped with 5% of Zn and 1% of Co under an atmospheric pressure was 7 parts by mass of $Co(OH)_2$, and 15 parts by mass of an 10 N aqueous NaOH solution was sprayed with stirring. Composite nickel hydroxide particles having cobalt higher oxide on the surface thereof were prepared by microwave heating. Then, oxidation was advanced by adding sodium hypochlorite to this reaction system to prepare composite nickel oxyhydroxide comprising cobalt higher oxide. Production of the composite nickel oxyhydroxide was confirmed by identification by X-ray powder diffraction and by analyzing that almost all the amount of Ni is in a trivalent state by reverse titration with iron (II) ammonium sulfate/potassium permanganate. The purity of Ni in composite nickel oxyhydroxide was measured to be 54% from EDTA titration and ICP analysis.

A cathode mix was formed by adding electrolytic manganese dioxide, carbon and an electrolyte solution to the positive electrode active substance of composite nickel oxyhydroxide obtained by the method above, and by molding. The carbon and the electrolyte solution was blended with composite nickel oxyhydroxide as higher nickel oxide in a mass ratio described below considering the strength of the molded cathode mix.

Composite nickel oxyhydroxide:carbon:12N KOH=100:6:5

Six kinds of the positive electrode active substances were prepared by adding no manganese dioxide and by adding 3% by mass, 5% by mass, 7% by mass, 9% by mass and 20% by mass of manganese dioxide to composite nickel oxyhydroxide. The density of the molded positive electrode active substance was around 3.22 g/cm$^3$.

An anode mix was formed using a mercury-free, lead-free zinc alloy used in conventional manganese dioxide zinc primary batteries. The composition of the zinc gel in the anode mix was as follows:

zinc:hygroscopic binder:12 N KOH=100:1.5:55

The zinc gel had a density of around 2.70 g/cm$^3$.

A 12 N aqueous KOH solution was used as the electrolyte solution.

The cathode mix and anode gel thus obtained were housed in vessels so that the negative to positive electrode theoretical capacity ratios are 1.31, 1.20, 1.10, 1.02 and 0.91, respectively, by weighing the mass of each component. The electrolyte solution was injected into each vessel. A metal plate and negative electrode top comprising a charge collector and gas release vent are crimp sealed by an integrated seal member. A nickel zinc primary battery of AA size shown in FIG. 1 was thus produced.

Test Example 1

After activating 30 kinds of batteries prepared by the method above by allowing them to leave at 25° C. for 3 days, four batteries of each kind were connected in series, and discharged with a constant current at 1 W of output by applying 4.0 V of cut-off voltage at 25° C. to measure the discharge duration. The results are shown in Table 1. Discharge duration unit is represented by hour in Table 1.

TABLE 1

| Continuous Discharge Characteristics with Four Batteries Connected in Series at 1 W/Cut Off voltage 4 V at 25° C.; unit = hour | | | | | |
|---|---|---|---|---|---|
| Addition Amount | Theoretical Capacity of Negative Electrode/ Theoretical Capacity of Positive Electrode | | | | |
| of MnO$_2$ | 1.31 | 1.20 | 1.10 | 1.02 | 0.91 |
| 0% | 11.1 | 10.7 | 10.3 | 9.8 | 9.0 |
| 3% | 11.0 | 10.6 | 10.3 | 9.7 | 9.0 |
| 5% | 10.9 | 10.6 | 10.3 | 9.8 | 8.7 |
| 7% | 10.7 | 10.6 | 10.2 | 9.6 | 8.7 |
| 9% | 10.5 | 10.4 | 10.2 | 9.6 | 8.9 |
| 20% | 10.2 | 10.3 | 10.0 | 9.6 | 8.6 |

Test Example 2

After activating 30 kinds of batteries prepared by the method above by allowing them to leave at 25° C. for 3 days, four batteries of each kind were connected in series, and discharged with a constant current at 3 W of output by applying 4.0 V of cut-off voltage at 25° C. to measure the discharge duration. The results are shown in Table 2. Discharge duration unit is represented by minute in Table 2.

TABLE 2

Continuous Discharge Characteristics with Four Batteries Connected in Series at 3 W/Cut Off voltage 4 V at 25° C.; unit = minute

| Addition Amount | Theoretical Capacity of Negative Electrode/ Theoretical Capacity of Positive Electrode | | | | |
|---|---|---|---|---|---|
| of $MnO_2$ | 1.31 | 1.20 | 1.10 | 1.02 | 0.91 |
| 0% | 120 | 117 | 116 | 111 | 82 |
| 3% | 120 | 118 | 116 | 111 | 80 |
| 5% | 117 | 115 | 114 | 109 | 80 |
| 7% | 110 | 113 | 110 | 105 | 73 |
| 9% | 100 | 98 | 95 | 90 | 60 |
| 20% | 80 | 78 | 77 | 70 | 58 |

Discharge of four batteries connected in series at 1 W corresponds to middle rate discharge in the alkali battery. Discharge of four batteries connected in series at 3 W corresponds to high rate discharge in the alkali battery. The results in Tables 1 and 2 show that discharge characteristics in middle rate to high rate discharge region are deteriorated as the theoretical capacity ratio of the negative to positive electrodes is decreased. This is conjectured that discharge in the middle rate to high rate region is determined by the negative electrode. It is desirable to keep the theoretical capacity ratio of the negative to positive electrodes to be 1.0 or more in order to improve discharge characteristics in this region.

Test Example 3

One hundred batteries (single cell batteries) in each of 30 kinds of the batteries prepared by the method above were discharged for 3 days under a load of 10Ω at 20° C., and the number of the batteries in which the safety valve was actuated by an increase of the inner pressure of the battery was counted. The safety valve was adjusted to operate at 6 MPa, which is approximately the same level as in conventional alkali batteries. The results are shown Table 3.

TABLE 3

Number of cells of 100 cells in which the safety valve is actuated, at 20° C., 10 Ω × 3 days

| Addition Amount | Theoretical Capacity of Negative Electrode/ Theoretical Capacity of Positive Electrode | | | | |
|---|---|---|---|---|---|
| of $MnO_2$ | 1.31 | 1.20 | 1.10 | 1.02 | 0.91 |
| 0% | 34 | 21 | 5 | 0 | 0 |
| 3% | 19 | 0 | 0 | 0 | 0 |
| 5% | 14 | 0 | 0 | 0 | 0 |
| 7% | 11 | 0 | 0 | 0 | 0 |
| 9% | 8 | 0 | 0 | 0 | 0 |
| 20% | 3 | 0 | 0 | 0 | 0 |

The results in FIG. 3 show that the potential of the positive electrode reaches a hydrogen generating potential when the theoretical capacity ratio of the positive to negative electrodes exceeds 1.0 since zinc remains in the negative electrode by overdischarge, and hydrogen gas is generated from the positive electrode. Since the amount of residual zinc is quite large when the theoretical capacity ratio of the positive to negative electrodes exceeds 1.3, it is difficult to design the battery based on the actuation level of conventional safety valves. However, since addition of manganese dioxide affords a margin of the discharge capacity at a voltage of 0.8 V or more, it is advantageous for increasing a substantial capacity ratio of the positive to negative electrodes available.

Since addition of manganese dioxide to the positive electrode reduces adhesion of powders on a mold as compared with the positive electrode molded with nickel oxyhydroxide only, a molded positive electrode having desirable shape and moldability can be produced. This seems to be advantageous for improving utilization efficiency of the positive electrode and for increasing a substantial capacity ratio of the negative to positive electrodes. A Theoretical capacity ratio of the negative to positive electrodes of 1.2 or less and a manganese dioxide content of 3% or more are effective for designing overdischarge.

Test Example 4

After activating 30 kinds of batteries prepared by the method above by allowing them to leave at 25° C. for 3 days, four batteries of each kind were connected in series, and discharged with a constant current at 3.0 W of output by applying 4.0 V of cut-off voltage at 25° C. to measure the discharge duration. The results are shown in Table 4. Discharge duration unit is represented by minute in Table 4.

TABLE 4

Continuous Discharge Characteristics with Four Batteries Connected in Series at 3 W/Cut Off voltage 4.0 V at 0° C.; unit = minute

| Addition Amount | Theoretical Capacity of Negative Electrode/ Theoretical Capacity of Positive Electrode | | | | |
|---|---|---|---|---|---|
| of $MnO_2$ | 1.31 | 1.20 | 1.10 | 1.02 | 0.91 |
| 0% | 44 | 42 | 41 | 39 | 30 |
| 3% | 44 | 40 | 41 | 38 | 30 |
| 5% | 43 | 41 | 38 | 37 | 26 |
| 7% | 40 | 37 | 35 | 34 | 26 |
| 9% | 25 | 22 | 22 | 16 | 13 |
| 20% | 23 | 20 | 18 | 15 | 12 |

The results in Table 4 show that a higher theoretical ratio of the negative to positive electrodes and smaller amount of addition of manganese dioxide are advantageous for high rate discharge at low temperatures in the battery of the invention. It was also revealed that a theoretical ratio of the negative to positive electrodes of 1.0 or more and a content of manganese dioxide of 7% or less are preferable.

The results in Test Examples 1 to 4 show that the theoretical ratio of the negative to positive electrodes in the range of 1.2 to 1.0 and the amount of addition of manganese dioxide in the positive electrode of 3 to 7% are quite effective considering the high rate discharge characteristics, high rate discharge at low temperatures, and increase of the inner pressure of hydrogen during the overdischarge process.

INDUSTRIAL APPLICABILITY

The invention provides an alkali battery being excellent in high rate discharge characteristics with less increment of the inner pressure by generating hydrogen during the overdischarge process.

The invention claimed is:
1. A sealed nickel zinc primary battery comprising:
at least a positive electrode comprising an oxide of trivalent nickel as a positive electrode active substance;

a negative electrode comprising zinc or an alloy thereof as a negative electrode active substance;
a separator; and
an electrolyte solution housed in a vessel,
wherein manganese dioxide is added in a proportion of 3 to 7% by mass relative to the oxide of trivalent nickel in the positive electrode, and the ratio of the capacity of the negative electrode to the capacity of the positive electrode (the capacity of the negative electrode/capacity of the positive electrode) is in the range of 1.10 to 1.20.

2. The sealed nickel zinc primary battery according to claim 1, wherein the positive electrode active substance is nickel oxyhydroxide as a eutectic crystal with zinc or cobalt alone, or with zinc and cobalt.

3. A method for producing a sealed nickel zinc primary battery according to claim 1, wherein the positive electrode active substance is a composite nickel oxyhydroxide as an eutectic crystal with zinc or cobalt alone, or with zinc and cobalt, coated with an oxide layer of cobalt on the surface.

4. The sealed nickel zinc primary battery according to claim 1, wherein the positive electrode further comprises carbon particles.

5. The sealed nickel zinc primary battery according to claim 1, wherein a mass ratio of the positive electrode active substance to the carbon particles ranges from 100:3 to 10.

6. The sealed nickel zinc primary battery according to claim 1, wherein compounds selected from the group consisting of Y, Er, Yb, Ca, and combinations thereof are added to the positive electrode active substance.

7. The sealed nickel zinc primary battery according to claim 1, wherein the positive electrode further comprises a binder.

8. The sealed nickel zinc primary battery according to claim 7, wherein the binder is selected from the group consisting of polytetrafluoroethylene; polyvinylidene fluoride (PVdF); modified PVdF prepared by substituting at least one of hydrogen and fluorine in PVdF with other substituents; a copolymer of vinylidene fluoride and 6-fluoropropylene; a ternary copolymer of polyvinylidene fluoride, tetrafluoroethylene and 6-fluoropropylene; polyethylene; and polypropylene.

9. The sealed nickel zinc primary battery according to claim 1, wherein the positive electrode further comprises a lubricant.

10. The sealed nickel zinc primary battery according to claim 9, wherein the lubricant is selected from the group consisting of graphite, stearic acid, and combinations thereof.

11. The sealed nickel zinc primary battery according to claim 1, wherein the zinc alloy comprises 0.06% by mass of indium, 0.014% by mass of bismuth, and 0.0035% by mass of aluminum.

12. The sealed nickel zinc primary battery according to claim 1, wherein the zinc alloy is a powder having a powder diameter ranging from 100 to 300 µm.

13. The sealed nickel zinc primary battery according to claim 1, wherein the electrolyte solution is an aqueous alkaline solution comprising potassium hydroxide or sodium hydroxide, and a zinc compound.

14. The sealed nickel zinc primary battery according to claim 13, wherein the zinc compound is selected from the group consisting of zinc oxide and zinc hydroxide.

15. The method for producing a sealed nickel zinc primary battery according to claim 3, wherein the oxide layer of cobalt comprises cobalt oxyhydroxide or tricobalt tetraoxide.

* * * * *